Figure 1:
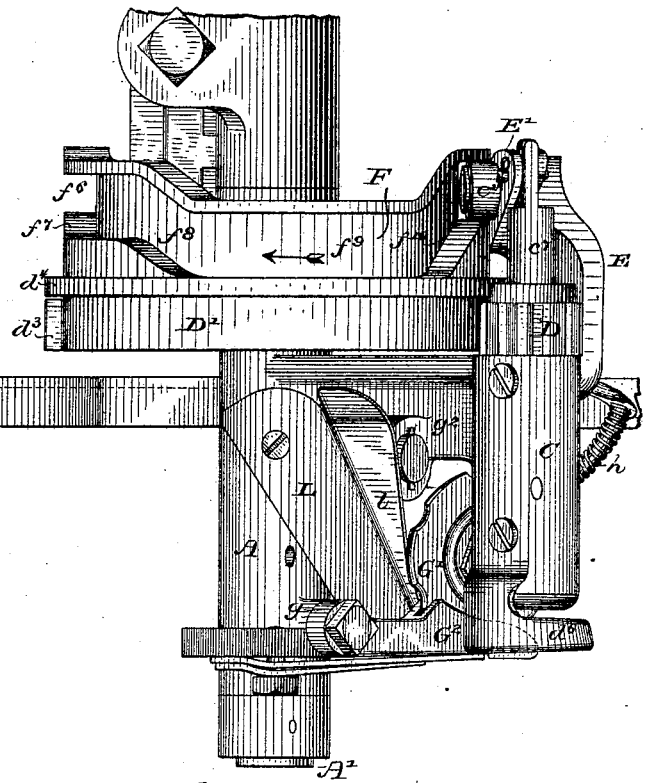

(No Model.)  6 Sheets—Sheet 1.

H. E. PRIDMORE.
GRAIN BINDER.

No. 390,987.  Patented Oct. 9, 1888.

WITNESSES,
Wm A. Skinkle
Geo. W. Young

INVENTOR,
Henry E. Pridmore.
By his Attorneys,
Parkinson & Parkinson (No Model.)  6 Sheets—Sheet 2.

H. E. PRIDMORE.
GRAIN BINDER.

No. 390,987. Patented Oct. 9, 1888.

WITNESSES
Wm A. Skinkle
Geo. W. Young

INVENTOR
Henry E. Pridmore.
By his Attorneys,
Parkinson & Parkinson (No Model.) 6 Sheets—Sheet 3.

H. E. PRIDMORE.
GRAIN BINDER.

No. 390,987. Patented Oct. 9, 1888.

WITNESSES,
Wm A. Skinkle.
Geo. W. Young.

INVENTOR,
Henry E. Pridmore.
By his Attorneys.

(No Model.) 6 Sheets—Sheet 4.

H. E. PRIDMORE.
GRAIN BINDER.

No. 390,987. Patented Oct. 9, 1888.

WITNESSES,
Wm A. Skinkle
Geo. W. Young.

INVENTOR,
Henry E. Pridmore.
By his Attorneys,
Parkinson & Parkinson (No Model.)  6 Sheets—Sheet 5.
H. E. PRIDMORE.
GRAIN BINDER.
No. 390,987.  Patented Oct. 9, 1888.
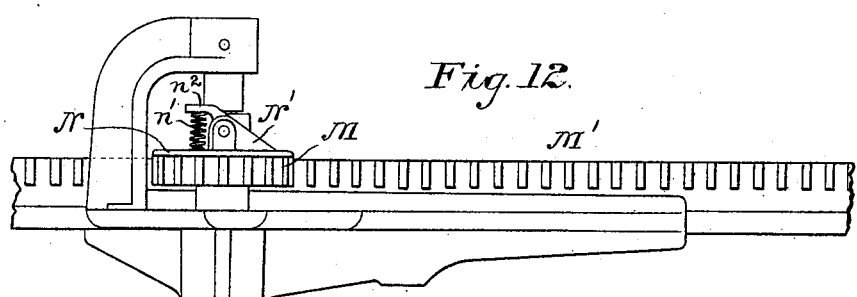
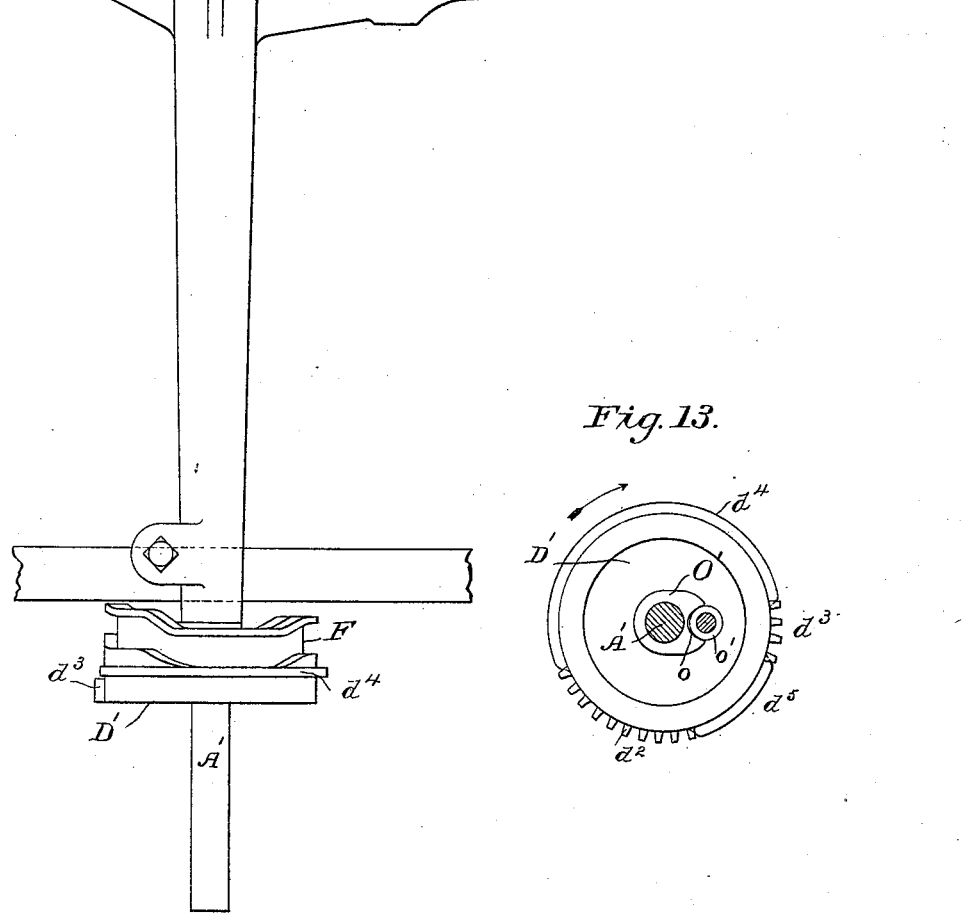
WITNESSES,
Wm A. Skinkle
Geo. W. Young
INVENTOR,
Henry E. Pridmore.
By his Attorneys,
Parkinson & Parkinson

UNITED STATES PATENT OFFICE.

HENRY E. PRIDMORE, OF CHICAGO, ILLINOIS, ASSIGNOR TO THE McCORMICK HARVESTING MACHINE COMPANY.

GRAIN-BINDER.

SPECIFICATION forming part of Letters Patent No. 390,987, dated October 9, 1888.

Application filed May 19, 1885. Serial No. 166,020. (No model.)

*To all whom it may concern:*

Be it known that I, HENRY E. PRIDMORE, a citizen of the United States, residing at Chicago, in the county of Cook and State of Illinois, have invented certain new and useful Improvements in Grain-Binders, of which the following is a specification.

My invention relates particularly to the knotting, holding, and severing mechanisms of grain-binders and to the methods of operating these; and it consists in combining with a revolving cord-knotter and the wheel which drives it a pivoted bearing or stock therefor, an arm projecting from said stock, and a cam-groove with which said arm engages, of such effective outline that in the tying operation the knotter is first carried toward the gavel to wind up the band ends and form a knot close to the straw, and is then carried away therefrom to tighten said knot; in a tubular knotter of improved construction; in combining with the holder-disk and its shoe and ratchet a bell-crank lever, a cam-wheel engaging with one arm of said lever, and a pawl and reversely-set knife carried by the other arm, so that the disk shall be actuated in the forward movement of the lever and the cord severed in its return movement; in combining with the holder a fag-chute to carry the fag-ends of the cord away from the operative parts, and in various other combinations and details of construction, hereinafter described and claimed.

For the purpose of explaining my invention I have illustrated and shall describe it as applied to a reciprocating carriage such as used upon one type of the well-known McCormick binder for many years past, without, however, intending thereby to in any wise limit myself to its use in connection with that specific type of machine.

Figure 2:
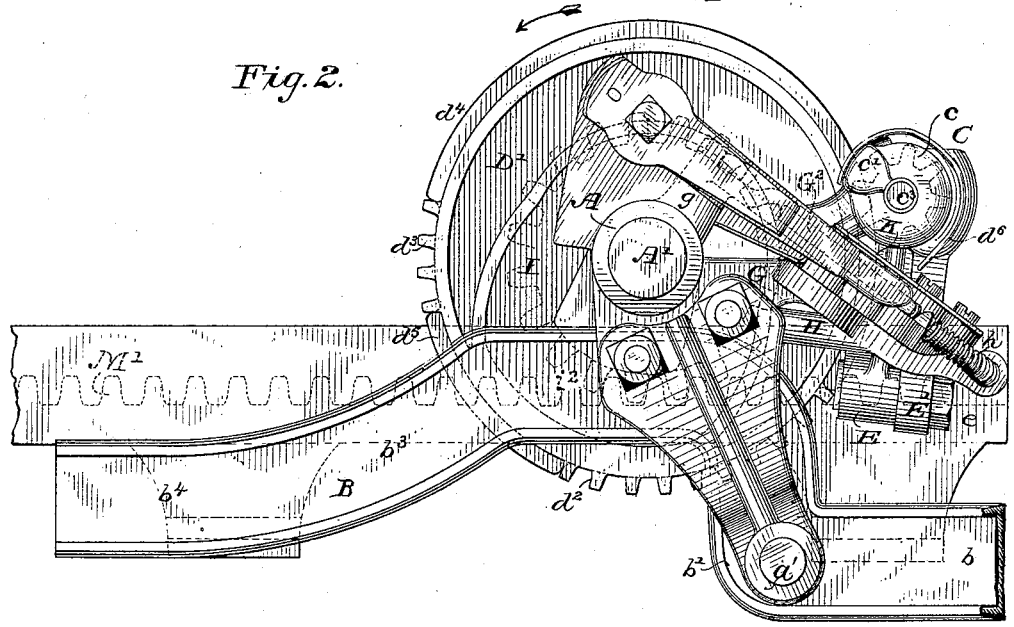
Figure 3:
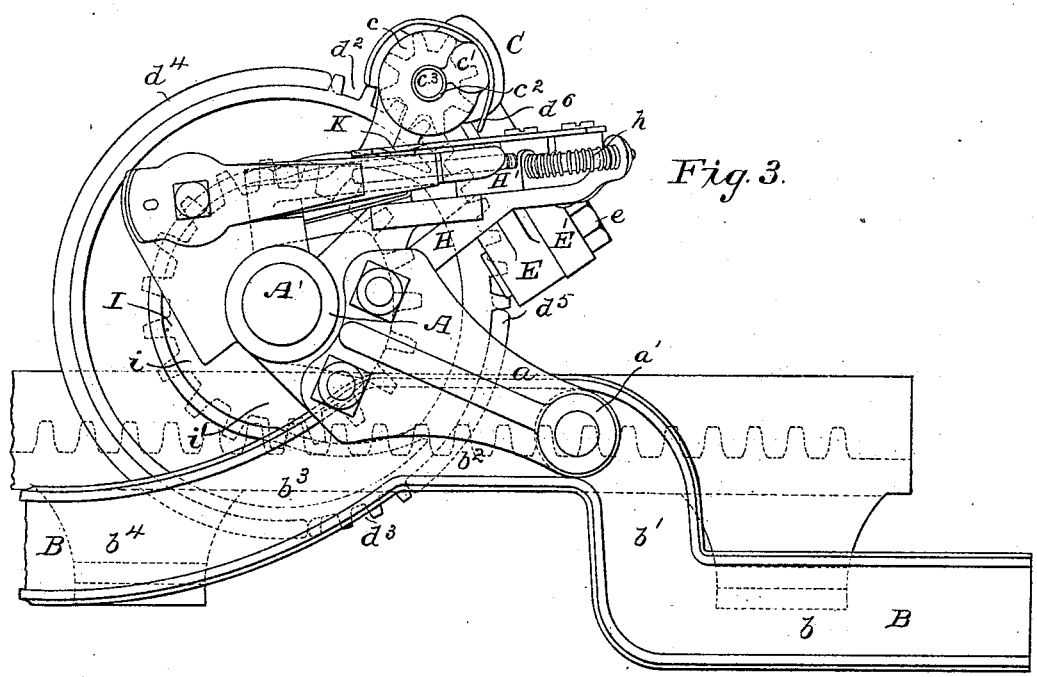
Figure 4:
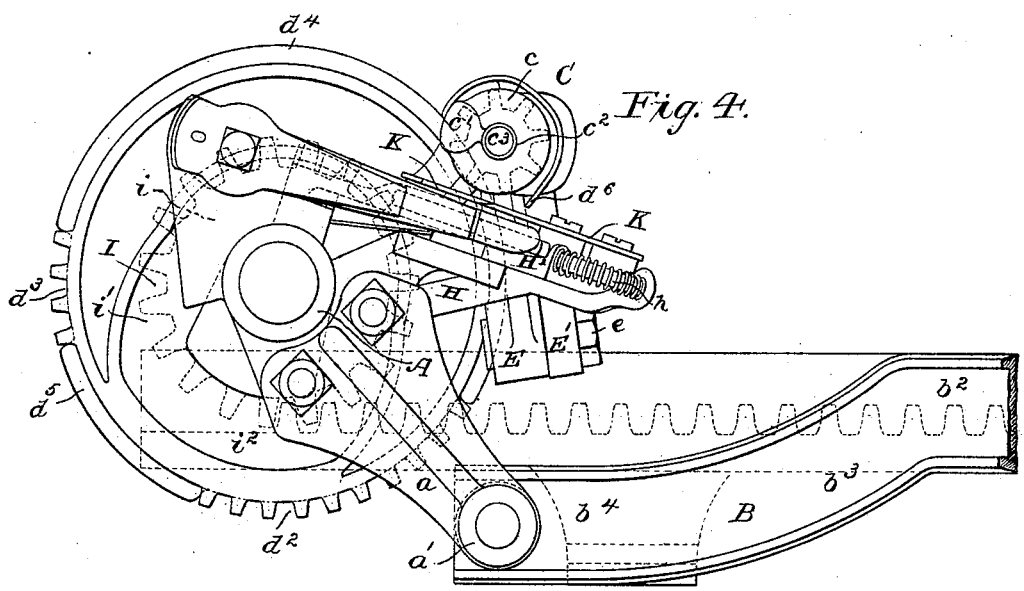
Figure 5:
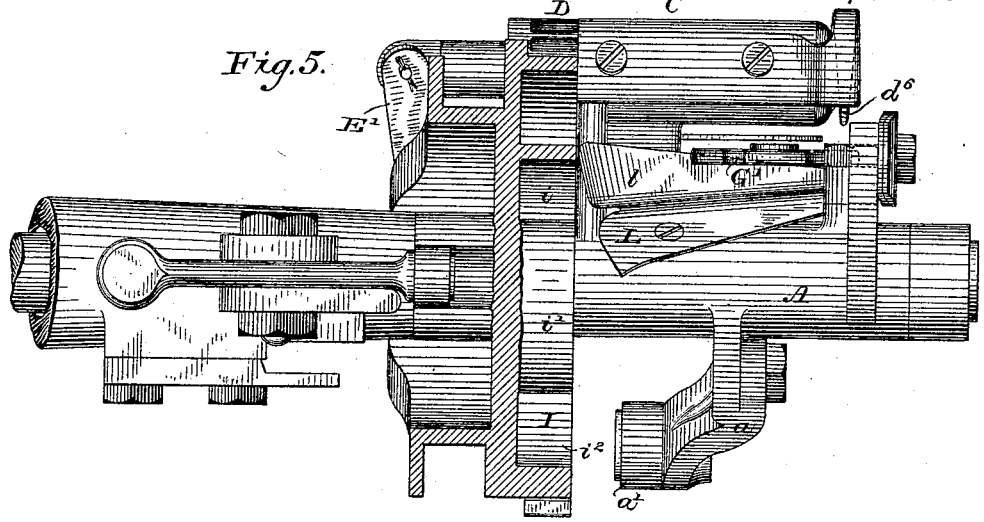
Figure 6:
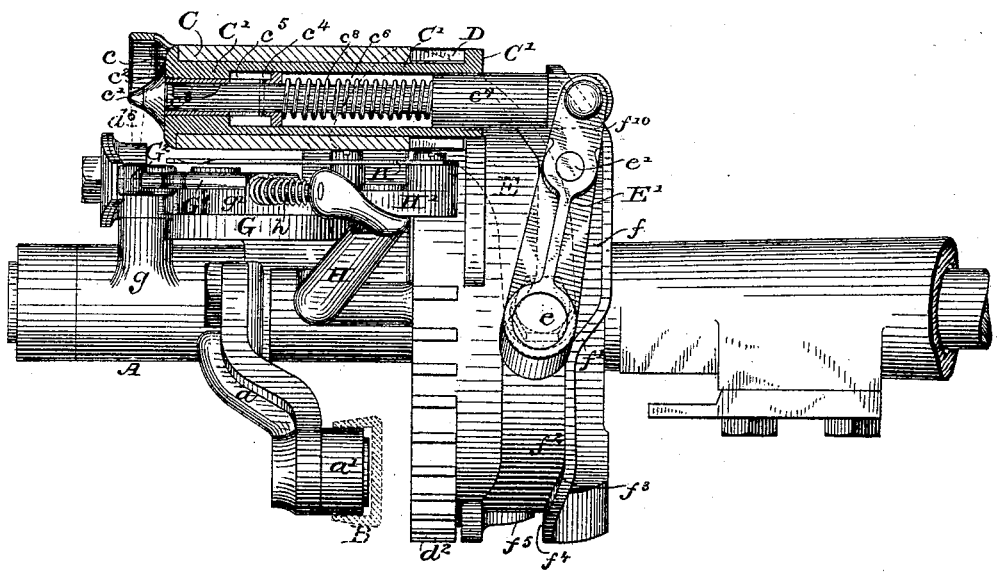
Figure 7:
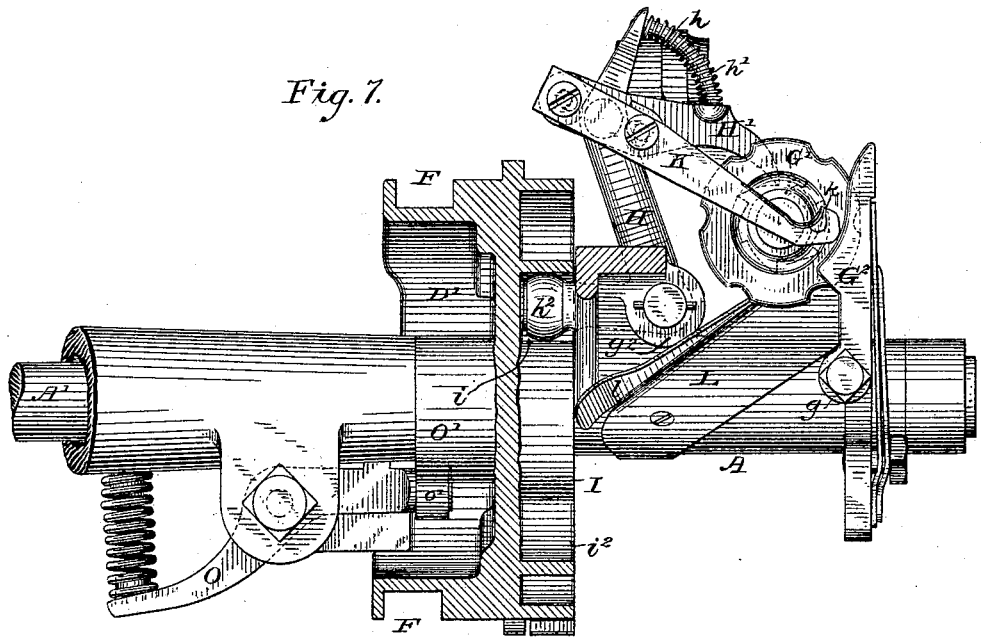
Figure 9:
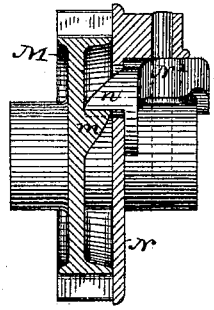
Figure 8:
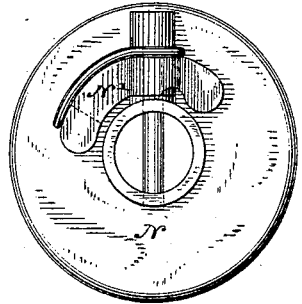
Figure 10:
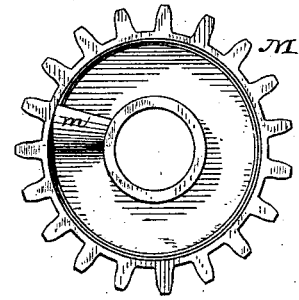
Figure 11:
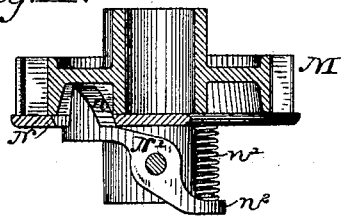
Figure 14:
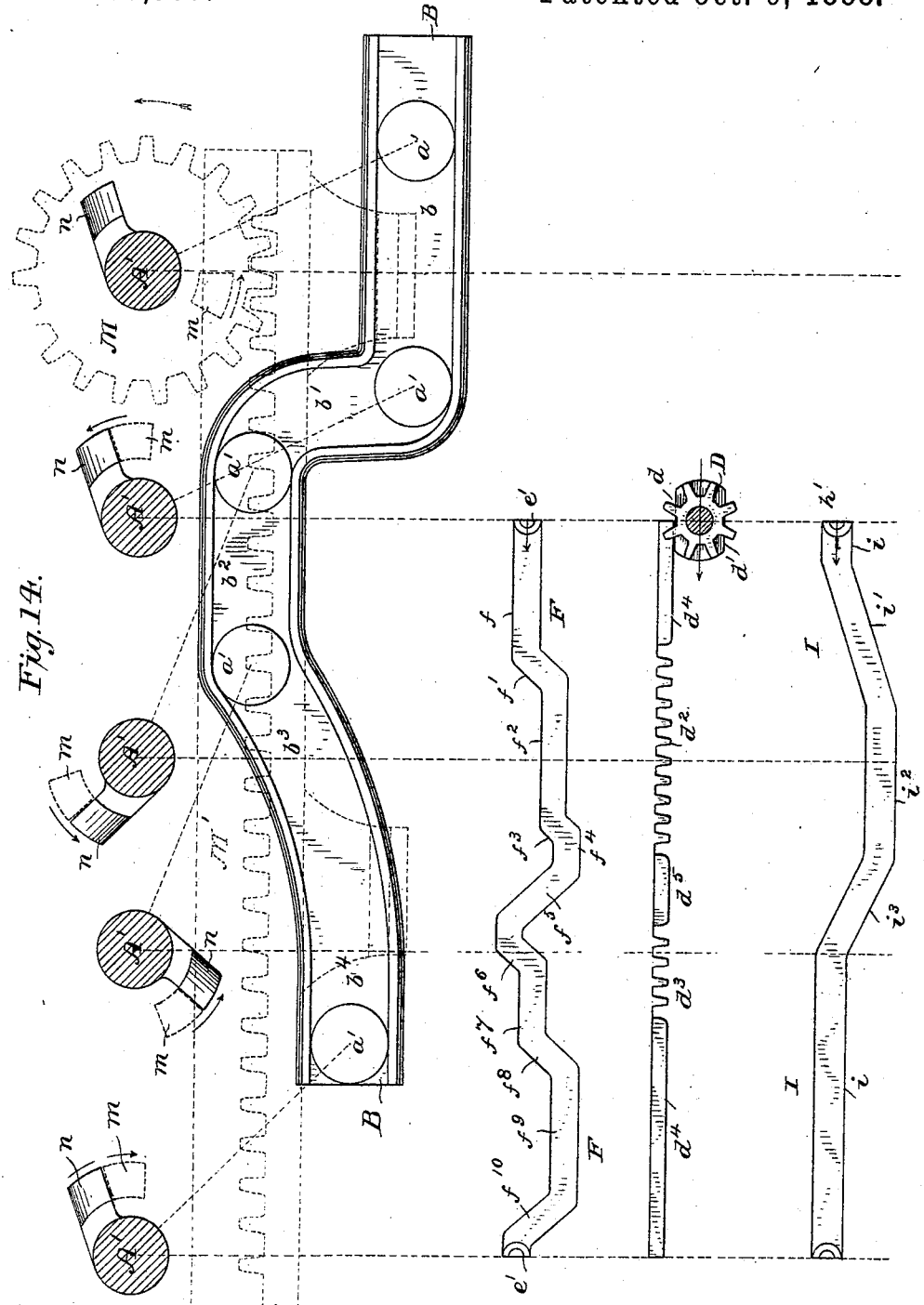

In the drawings, Figure 1 is a top plan view of my improved knotting, holding, and cutting devices and their actuating mechanism. Fig. 2 is an end elevation thereof, showing, also, part of the supporting-frame and actuating-rack of the reciprocating binder; Fig. 3, a like side elevation, with said devices in an advanced position and the knotter at its nearest point of approach to the gavel. Fig. 4 represents said devices in still a further stage of action, the knotter having receded from the gavel to tighten the knot; Fig. 5, an elevation from the inner or grain side of the machine of the same devices, with part broken away to more clearly expose the mechanism. Fig. 6 is an elevation from the outer or stubble side, with the knotter in longitudinal section. Fig. 7 is a top plan view, with the knotter removed to more clearly display the holder-actuating and cord-cutting devices, and with the gear and cam wheel which drives the knotter and said devices in section. Figs. 8, 9, 10, and 11 are details of the clutch or coupling device which I employ in order to actuate the shaft carried by the reciprocating binding-carriage and which in its turn actuates the gear and cam wheel; Fig. 12, a top plan view of part of the reciprocating binding-carriage, including said shaft and the gear and cam wheel and clutch and one of the ways upon which said carriage travels, showing the rack which operates the shaft in the outward traverse; Fig. 13, a cross-section through said shaft on the inner side of the gear and cam wheel, to show the spring-brake by which the shaft is held against motion at its intervals of rest; and Fig. 14, a diagram illustrating the relative actuations of the knotter, holder, and cutter, both as to their component parts and as to the swinging movement of the knotter.

A represents a supporting stock or bearing pivoted, in the present instance, upon a shaft, A', which is the binder-carriage shaft. This stock has an arm or heel piece, $a$, carrying a laterally-projecting stud or anti-friction roller, $a'$, which takes into a cam groove or track, B, fast to the supporting-frame of the binder, so that as the carriage reciprocates back and forth the stock may be actuated by the flexions of said cam-groove. At its commencement, or the right-hand end as it is shown in the drawings, this groove has a straight reach, $b$, so that the stock may be held stationary in the initial movement of the binder-carriage after receiving a gavel and while the binder-arm is coming down. Next, it has an ascending reach, $b'$, which raises the stock immediately before the knotter begins to turn, as will be presently explained, and continues to lift it until it has carried the knotter into close proximity with the gavel; then there is a short straight reach, $b^2$, which retains the stock stationary for a moment, with the knotter still in close proximity with the gavel while the knot is being completed; finally, a descending reach, $b^3$, whereby the stock is swung down, drawing the knotter away from the gavel to pull upon and tighten the folds of the knot, this reach, however, terminating in a straight reach, $b^4$, which corresponds to the time when the binder-carriage nears the extreme of its outward traverse and the bundle is to be ejected. Any of the usual forms of knotters may be used in connection with this swinging stock or bearing for the purposes enumerated; but that which I have devised and shall describe herein is of the tubular type. It is mounted horizontally in the upper part of the stock and is constructed as follows:

A casing, C, is fixed on the stock, so as to be rigid therewith, and within this casing is placed the rotary sleeve C', having at its extreme end a disk or button, $c$, capping the exposed end of the casing, rounded on its face to facilitate the slipping of the cord in forming the knot, and provided at one side with an inwardly-curved looping-finger, $c'$, directed toward the axis of the knotter. The front part of this sleeve C' is bored to admit a tube, $c^2$, into which fits the spindle of a cord-hook, $c^3$, connected with said tube by pins $c^4$ playing in longitudinal slots $c^5$ therein. The rear part of the sleeve has a bore of greater diameter, forming a cylindrical chamber, $c^6$, in which plays the enlarged head $c^7$ of the cord-hook spindle, and the tube $c^2$ is flanged at its inner end to also fit and play within this chamber. A spring, $c^8$, is coiled about the spindle of the cord-hook, pressing at one end against the flange on the tube and at the other against the head of the spindle, so that whenever the latter is projected it will carry the tube along with it until the flange on said tube comes in contact with the forward end of the chamber. At this moment the tube will have reached the tip of the looping-finger on the rotating sleeve and come just about flush with its outer end, and the two will make a close joint, so that the cord lying between them cannot escape. Should the cord-hook now be forced farther on, which will be permitted by the slot-and-pin connection just mentioned, it will project beyond the tube and will be ready to receive the end strands of the cord after the loop has been crossed by the rotation of the knotter.

The rear end of the sleeve is formed with a pinion, D, and delay-shoes $d\ d'$, which respectively engage with segments $d^2$ and $d^3$, and delay-ledges $d^4$ and $d^5$ on the periphery of the gear and cam wheel D', fixed to the binder-shaft, so as to be rotated as the binder-carriage reciprocates, the first segment serving to give the rotation necessary to form the loop and cross its ends, and the second, after the interval of delay during which the cord-hook seizes the crossed ends and draws them into the tube, imparting a further rotation to carry the looping-finger to its initial or receiving position.

To prevent or guard against any accidental derangement of the cord, either before or while being tied, a portion of the casing on the inner side is extended beyond the end of the main part and provided with an arm, $d^6$, curved concentrically with the rotating sleeve and reaching down into close proximity with the holder, so that the cord stretching up therefrom cannot be swung aside.

To a hanger, E, from the stock or from the casing of the knotter is pivoted at $e$ a lever-arm, E', jointed at its free end to the head of the cord-hook and having, intermediate between this joint and its pivot, a stud or anti-friction roll, $e'$, which enters a cam groove or track, F, upon the periphery of the gear and cam wheel exteriorly to the segment-racks and delay-ledges, by which cam-groove the cord-hook and the cord-tube are given the movements already referred to. When the knotter is at rest previous to a binding operation, the stud from the lever lies in the straight reach $f$ in said groove; but after the cord has been brought down and laid in the looping-finger the revolution of the gear and cam wheel brings around an inward jog or reach, $f'$, inclined just sufficiently to project the cord-hook and cord-tube co-ordinately to close past said looping-finger. Then a second straight reach, $f^2$, of such length that the loop is nearly formed by the revolution of the knotter before it terminates, is entered by the stud. This is succeeded by another short inward jog or incline, $f^3$, which projects the cord-hook to catch the strands of cord as they are crossed; then by a short straight reach, $f^4$, during which the continuing revolution of the knotting-finger has fully crossed the strands and they have been caught by the hook; this again by a long outward incline, $f^5$, equal in length to the two inward inclines, which withdraws both the cord-hook into the tube and the tube and hook into the sleeve, the revolution of the knotter being meanwhile intermitted by the delay-surface $d^5$, with which its shoe $d'$ has engaged, and this by a short inward incline, $f^6$, which again projects the tube, the hook of course accompanying it, thus giving a little slack just as the knotter begins to swing away from the gavel. Now comes another straight reach, $f^7$, during which the knotter continues its movement away from the gavel to tighten the knot, the bight of which is still held by the cord-hook. Then a further inward incline, $f^8$, which projects the cord-hook to release the bight. Then, after another straight reach, $f^9$, which gives sufficient time for the loop to be disengaged from said hook, there is an outward incline, $f^{10}$, carrying both the hook and the tube into their original or starting position, when the knotter ceases to move and the binder reaches the end of its outward traverse.

Upon a bracket, G, from the oscillating stock beneath the knotter, when that is in its highest position, is journaled the rotary notched disk G', one side of which is embraced by the spring-pressed shoe $G^2$, pivoted to a lug, $g$, from said bracket. The disk has the usual ratchet, $g'$, beneath, and will be restrained from retrogression by a click, as customary in this style of holders. To another lug, $g^2$, from said bracket, on the inner side of the stock, is pivoted a bell-crank lever, H, one arm of which supports the pivoted pawl H', and, by an extension, affords a seat for one end of the coiled spring $h$ and a guide for the play of the curved sustaining-rod $h'$, which that spring embraces, the other end of the rod being secured to the pawl so as to force it into engagement with the ratchet on the disk. The second arm of the bell-crank is provided with an anti-friction roller, $h^2$, and enters a cam groove or way, I, formed in the adjacent side of the gear and cam wheel and receives movements therefrom to actuate the bell-crank. This cam-groove extends from near the hub to near the periphery of the wheel, being concentric immediately around the hub and also at the periphery, so as to hold the bell-crank stationary and connecting with these concentric reaches by flaring ways which serve to actuate the lever in one direction and the other.

When the cord is brought down, the actuating-arm of the bell-crank is near the end of the concentric reach $i$, which, being the one around the hub, gives the longest period of delay. Immediately thereafter the combined rotation of the gear and cam wheel and rising oscillation of the stock bring said arm into the flaring reach $i'$, which causes the other arm of the bell-crank to be swung toward the holder-disk, forcing the pawl against the ratchet thereon, and rotating the disk to grasp the cord. Before this rotation is quite finished the knotter itself begins to turn, but only by its concurrent movement, to bring the cord-finger against the cord, so that the latter may be confined by the projecting movement of the cord-tube. The cord-strands having been thus confined in the knotter and fully secured in the holder, the rotation of the gear and cam wheel brings around the outer concentric reach, $i^2$, which gives a relatively short delay, terminating at the moment when the ends of the cord have been crossed by the looping-finger and laid in the cord-hook. Then the inwardly-flaring reach $i^3$ acts upon the bell-crank to retract it from the ratchet-tooth with which it has been engaged, this causing its nose to ride up the back of the adjacent tooth and giving it a lateral movement outward.

Now, upon the shank of the pawl is secured a knife, K, which extends over the holder-disk to the shoe and has a recessed cutting edge, $k$, as shown. Before the disk is actuated—that is, before the pawl is thrust forward—this knife is held by the withdrawn bell-crank and inwardly-pressed pawl in such position as to be out of the way of the cord and to be guarded thereagainst by the disk, itself lying almost diametrically over the disk. When the pawl is thrust forward to turn the disk, the cutting-edge of the knife is brought right over the edge of the clamping-shoe, just beyond the point to which the cord will be carried by the rotation of the disk, and when the pawl is withdrawn and rides up the back of the ratchet-tooth behind it, as just explained, the knife itself will by this movement be swung forward toward and against the cord and drawn past it to sever it.

In the use of disk-holders, and indeed of nearly all holders, if not all, fag-ends are left by the severing of the cord, which generally or frequently get into the machinery, causing trouble. To obviate this defect, I arrange behind the holder, and leading from the point where it discharges these fags, a deflecting plate or shoe, L, of sheet metal, inclined downward and having at the side adjacent to the operative parts or at both sides, if they are operative on both sides, an oblong flange, $l$, of sufficient height to prevent the escape of fags except over the tail of the chute. When these devices are used upon a traversing binding-carriage, as shown in the drawings, and herein described for the purpose of the case, it is necessary that a little time should be given after the commencement of the outward traverse before they are put in operation, so as to permit the binder arm to come down and place the cord in position for the action of the holder. Therefore a coupling must be employed between the shaft that operates these devices and the pinion M, that engages with the rack M' of the supporting-way, which will permit of said movement. It is also necessary or desirable that this coupling shall be under control of an attendant, or of some one about the machine, so that the shaft may be thrown out of gear at any point in the traverse of the carriage. To this end I mount the pinion M loosely upon the shaft and provide it with a single ratchet-tooth, $m$, upon its outer face, which is cupped, and upon the end of the shaft outside of the pinion fix a disk, N, which closes the cupped side thereof. To a lug upon the exposed face of this disk is pivoted a dog, N', having at its nose a single ratchet-tooth, $n$, which passes through a slot in the disk to engage with the ratchet-tooth on the pinion, and is pressed into such engagement by a spring, $n'$, acting upon a thumb-piece, $n^2$, at its heel end. Upon the carriage, or that arm of the carriage which embraces the shaft, is pivoted a brake-dog, O, spring pressed against an eccentric, $o'$, formed upon the shaft, or more conveniently upon the hub of the gear and cam wheel, as shown in Fig. 13. At the end of the longer radius this eccentric has a recess, $o$, to receive a roller, $o'$, on the end of the brake-dog. With this arrangement it is evident that when the carriage is moving inward the driving-tooth and the pinion will leave the driven dog and ride past it without actuating the shaft, which is held stationary by the brake-dog; and the length of the actuating-rack being such that at the termination of the inward traverse this tooth will have been carried a certain number of gear-teeth beyond the lug, sufficient time will be given at the commencement of the outward traverse for the binder-arm to come down and place the cord before the tooth, (now in its reverse movement,) engages with the perpendicular face of the dog and clutches with the shaft to drive it.

The eccentric shape of the hub on which the brake-dog runs, and the pressure of the dog thereon, prevents a too violent starting of the mechanism moved by the shaft, and permits it to be gradually and easily moved, and at the termination of the outward traverse in which the shaft makes exactly a single revolution, this eccentric again, by the resistance which it offers to the brake-dog, acts with the effect of a buffer to ease down the stopping of the mechanism and of the carriage. Of course the driving-dog, being exposed to the shaft, can be uncoupled at any point along the rack by simply pressing upon its heel end, thus allowing the knotting, holding, and cutting devices to be thrown out of action should any cause necessitate this.

I claim—

1. The combination, substantially as hereinbefore set forth, with a cord-knotter, of a pivoted stock therefor, in which said knotter is journaled, an arm projecting from said stock, a cam-groove, with which said arm engages, of practically the outline described, and a wheel engaging with said knotter and rotating it, whereby in the tying operation the knotter is first carried toward the gavel while revolving to wind up the band ends and form a knot close to the straw, and is then carried away therefrom to tighten said knot.

2. The combination, substantially as hereinbefore set forth, of a traversing binding-carriage, a stock pivoted upon the end of a shaft in said carriage, a knotter mounted in said oscillating stock, an arm from the stock, and a camway with which said arm engages, of practically the outline described, whereby the carriage moves upward in the binding operation, the stock is first oscillated to carry the knotter up toward the gavel, and then oscillated in the reverse direction to carry the knotter away from the gavel.

3. The combination, substantially as hereinbefore set forth, with a tubular knotter and with the cord-holder, of the curved arm projecting from the casing beyond the end of said knotter and curving concentrically therewith down to a point close to the holder and between which and the end of the knotter-tube the strands are laid to prevent the displacement of the cord endwise of said knotter.

4. The combination, substantially as hereinbefore set forth, to form a tubular knotter, of the rotary sleeve having an incurved looping-finger at its end, the cord-hook having an enlarged head of its spindle playing in a cylindrical chamber at the rear end of said sleeve, the cord-tube having a flange fitting within said chamber and connected with the spindle of the hook by a pin or pins therefrom taking into longitudinal slots in the tube, and the coiled spring seated against the enlarged head and against the flange of the tube within the chamber.

5. The combination, substantially as hereinbefore set forth, of a rotating sleeve having an incurved looping-finger at its end, a tube fitting within a bore at the finger end and having a flange playing within a cylindrical chamber at the rear end, a cord-hook playing through said tube and connected therewith by a pin or pins engaging in longitudinal slots in the body of the tube, a coiled spring encircling the spindle of the hook and seated at one end against the flange of the tube and at the other against an enlarged head or shank of said spindle which plays within said chamber, a lever pivoted to the supporting-bracket and pin-jointed to the end of said shank, a lug from said lever entering a camway in the periphery of a revolving wheel to cause it to project and retract the hook and gear teeth, and delay-ledges on the periphery of said wheel acting to revolve the sleeve and to hold it stationary by engagement with a pinion and delay-shoes at its rear.

6. The combination, substantially as hereinbefore set forth, with the holder-disk and its shoe and ratchet, of the bell-crank lever, the cam-wheel engaging with one arm of said lever, and the pawl and reversely-set knife carried by the other arm, whereby the disk is actuated in the forward movement and the cord severed in the return movement of the said lever.

7. The combination, substantially as hereinbefore set forth, with the holder-disk and its shoe, of the bell-crank lever, the camway in the side of the gear and cam wheel engaging with one arm of said lever, the pawl pivoted to the other arm of the lever and spring-pressed into engagement with a ratchet on the holder-disk, and the knife fixed to said pawl, in the manner described.

8. The combination, substantially as hereinbefore set forth, with the cord-holder, of the fag-chute extending from the ejecting-point of said holder to a point clear of the operative mechanism, to direct the fag-ends away therefrom.

9. The combination, substantially as hereinbefore set forth, with the rotary holder-disk and its shoe, of the fag-chute sloping from the heel of the shoe to a point clear of the mechanism and having a guard flange or flanges.

10. The combination, substantially as hereinbefore set forth, with the driving-shaft, of a brake-dog pivoted to its supporting-frame and an eccentric upon said driving-shaft, recessed at the end of its longer radius to receive a roller from the brake-dog, whereby the shaft is eased at its stopping and locked against movement.

11. The combination, substantially as hereinbefore set forth, with the driving-shaft in the subtending arm of a reciprocating binder, of a rack on an outer supporting-way, a pinion mounted loosely on the shaft and having a single driving-tooth on its outer face, a disk fixed to the shaft exterior to the pinion and in close proximity thereto, and a driving-dog pivoted to the exterior of the disk, that it may be released from the driving-tooth at any point along the rack to uncouple the shaft.

12. The combination, substantially as hereinbefore set forth, with the knotter, the holder, and cutter, and the stock in which they are mounted, of the segment-racks and delay-ledges to rotate said knotter, the camway on the periphery of the driven wheel, to reciprocate the cord-hook, the cam groove or way in the face of the wheel to actuate the holder, and the cam-tracks whereby the stock is oscillated.

HENRY E. PRIDMORE.

Witnesses:
 WILLIAM R. BAKER,
 PAUL ARNOLD.